Figure 1:
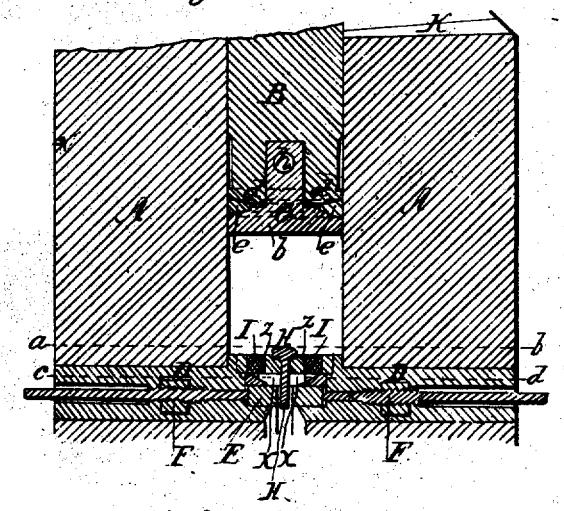

Sheet 1-3 Sheets.

J. & C. Hanson.

Making Metallic Pipe.

No. 82. Reissued Mar. 14, 1846.

Witnesses;

Alex A. Pay

William Worth

Inventors;

John Hanson

Charles Hanson

Sheet 2 - 3 Sheets.

J. & C. Hanson.

Making Metallic Pipe.

No. 82. Reissued Mar. 14, 1846.

Witnesses:
Albert Pugh
William Worle

Inventors,
John Hanson
Charles Hanson

Sheet 3-3 Sheets

J. & C. Hanson.

Making Metallic Pipe.

No. 82. Reissued Mar. 14, 1846.

Witnesses;
Wm. McPay
William Porch

Inventors,
John Hanson
Charles Hanson

UNITED STATES PATENT OFFICE.

JOHN HANSON AND CHARLES HANSON, OF HUDDERSFIELD, ENGLAND, ASSIGNORS TO BENJAMIN TATHAM, JR., HENRY B. TATHAM, AND GEORGE N. TATHAM, OF PHILADELPHIA, PENNSYLVANIA.

IMPROVEMENT IN MACHINERY FOR MAKING METALLIC PIPES.

Specification forming part of Letters Patent No. 2,021, dated March 29, 1841; Reissue No. 82, dated March 14, 1846.

*To all whom it may concern:*

Be it known that we, JOHN HANSON, of Huddersfield, in the county of York, England, leaden-pipe manufacturer, and CHARLES HANSON, of the same place, watch-maker, being respectively subjects of the Queen of Great Britain, have invented certain new and useful Improvements in Machinery or Apparatus for Manufacturing Pipes and Tubes from Metallic Substances; and we, the said JOHN HANSON and CHARLES HANSON, do hereby declare that the nature of our said invention and the manner in which the same is to operate are particularly described and ascertained in and by the following description thereof, reference being had to the drawings hereunto annexed, numbered, respectively, Sheet 1 and Sheet 2, and to the letters and figures marked thereon—that is to say:

Our invention consists in certain improvements upon and additions to the machinery used for manufacturing pipes and tubes from lead or tin or any alloy of soft metals capable of being forced by great pressure from out of a receiver through or between apertures, dies, and cores when in a set or solid state, set forth in the specification of a patent granted to Thomas Burr, of Shrewsbury, in Shropshire, in England, dated the 11th day of April, 1820, recited in the Repertory of Arts, &c., London, second series for 1822, volume 41, pages 267, &c., and described in the London Journal of Arts and Sciences, No. VI, for November, A. D. 1820, page 411, &c.

The apparatus described by Thomas Burr consisted of a hollow vessel, of iron or other metal, made particularly strong, so as to be able to sustain extreme pressure, and bored sufficiently true for a piston to traverse easily within it. This vessel was closed at one end by the piston, and it was also closed at the other, excepting a small aperture in the center, into which was fitted a "washer" or die, of steel or other metal, intended to determine the external diameter of the pipe. The best form of this vessel is cylindrical, and it is termed the "cylinder;" but it might be of various shapes. It was intended to contain the lead or other metal to form the pipes. The piston that fitted this cylinder was of about equal length, and when driven home was intended to empty or nearly empty the cylinder of its contents. The core or mandrel which determined the inner diameter of the pipe was a long cylindrical rod attached by one end to the center of the face of the piston and passing through the center of the aperture or die, leaving a space between them for the formation of the pipe. The pressure necessary to work the machine was obtained from any mechanism of sufficient force; but a very powerful hydraulic press was preferred, and the piston was driven home into the cylinder by the power of the ram of the hydraulic press, to the top of which press the cylinder was attached. Heat was applied to the cylinder before and at the time of using, whereby the apparatus worked more easily, from causes which will hereinafter sufficiently appear. The metal to compose the intended pipe was admitted into the cylinder in a fluid state through the same aperture by which the pipe afterward issued. Upon the metal becoming set or solid the power of the press was exerted against the piston, whereby it would rise upward and drive out the metal through the washer or die having the long core within it, continually advancing with and before the piston, and thus forming the pipe.

The machinery and its operation will be better understood by reference to the patent and to the publications mentioned, which are well known among mechanics and scientific men. But the defects of Thomas Burr's plan, when reduced to practice, (especially in the manufacture of pipes of less than one and a half inch in bore,) were found to be so great as to prevent that plan from being brought into common use. The long core in his machinery, being attached to the piston, is liable, in advancing with it, to warp and twist out of the straight line and out of center with the die, from the difference of expansion and contraction of the metal under different degrees of temperature, and from the extreme pressure required, and from other causes which prevent or destroy the uniformity of the thickness and the centrality of the bore of the pipes or tubes.

We have found from experience that lead and some of its alloys, when recently become set, (or in a condition just short of fluidity,) being still under heat and extreme pressure in a close vessel, will reunite perfectly after a separation of its parts, and "heal," as it were, by the first intention, as completely as though it had never been divided. We therefore construct our machinery as follows, to wit:

First. We employ a contrivance which may be called a "bridge," a "cross-bar," a "holder," or a "guide-piece," which is placed near to the die or aperture at the end of the cylinder, for the purpose of receiving and holding a short fixed core or of guiding the movable long core, as hereinafter described. This bridge is fixed within and at the end of the cylinder, and at a short distance from the die through which the pipe issues. It is so formed and arranged as to allow the metal to pass through it and to form around the core.

Secondly. We in general use a short fixed or stationary core for determining the inner diameter of the pipes or tubes, or the bore thereof, in contradistinction to the long movable core, as described in the specification of Thomas Burr. This short core is attached to the bridge in any secure manner; or the bridge and the core might be constructed in one piece and formed in various ways, as convenience might suggest. Instead of this short core, however, we sometimes use the long movable core attached to the piston, resembling that of Thomas Burr, and in this case we employ the bridge for the purpose of guiding the long core and keeping it central with the die, the said movable core traversing freely through an aperture in the center of the bridge, which in this case operates as a guide-piece.

Thirdly. We form a chamber between the bridge and the die, wherein the metal, after passing the bridge, may reunite into one mass, having the core in its center. It is the space before the die. The chamber may be made of any convenient form or size. In the accompanying drawings it is exhibited sometimes cylindrical, as at K K, Figure 19, Sheet 1, sometimes nearly square, as at K K, Figs. 7, 9, 10, and 11, Sheet 2, and sometimes conical, as at X, Figs. 1, 20, and 21, Sheet 1, and at Fig. 22, Sheet 2. This chamber may be a part of the cylinder itself, or of the die, or even of the bridge, or it may be formed by a separate piece or pieces securely fastened to the end of the cylinder or otherwise. We prefer the latter plan from the facility it gives of removing and changing the cores and dies, when required, to make pipes of different sizes, and the conical form may be preferable, as it may diminish the friction and require less pressure. The chamber should be larger in area or in diameter than the aperture between the die and the core, to facilitate the passage of the metal and to admit of constriction at the die, by which the metal is brought into its proper form of pipe, it being the narrowest aperture. The die we use is substantially the same as that described by Thomas Burr under the appellation of a "washer." It should be of steel or other metal, with a suitable aperture through it to form the exterior of the pipe. The particular form of the die is not material; but it is essentially different both in shape and object from a mold. It is usually constructed of a separate piece; but it might be formed of several pieces, or be made a part of others; or an aperture in the end of the cylinder itself might be used as a die. Various forms might be suggested. It is best, though not essential, that the surface inside which forms the exterior of the pipe should be as short as possible consistently with the strength required to sustain the great pressure and constriction at this narrow passage. We use substantially the same cylinder and piston as described by Thomas Burr. We use much the same heat and the same pressure. We use the bridge either as a guide-piece for his long core, or, in preference, we employ the bridge as a holder for our short core.

The following four enumerated particulars are matters of convenience, but are by no means essential to our apparatus:

First. We use an improved mode of adjusting the die, by which we are enabled easily and readily to bring the same central with the core at any time in case it should be forced out of its relative true position.

Secondly. With a view to prevent the escape of the lead between the piston and the cylinder, we sometimes use an improved construction of the piston, by which its packing is forced outward against the inside of the cylinder by the pressure of the face or end of the piston against said packing. It will be better understood by referring to the drawings. There are also other methods by which the same object can be effected.

Thirdly. We reverse the arrangement of the cylinder and piston by placing the piston above and the cylinder below, instead of securing the cylinder to the top of the hydraulic press, as in Thomas Burr's plan. In our method, when a hydraulic press of that kind is used in which the power of the ram is exerted from above, we should attach the piston to the ram and cause it to be driven downward into the cylinder, fixed stationary to receive it. Very great force, however, being required, we prefer a hydraulic press of the opposite construction, in which the ram is made to rise perpendicularly upward, and in this case we secure the piston to the top of the press and place the cylinder beneath, upon the table or platform, supported by a hollow pillar, with an aperture for the passage of the pipe, all resting upon the usual ram of the hydraulic press. Thus, when the ram ascends, the cylinder is made to rise and advance upon the stationary piston. (See Fig. 22, Sheet 2.) In connection with this reversed arrangement, we feed the cylinder through an aperture in the upper end or side opposite to the dies and directly under the piston when the dies and piston are at the greatest distance apart, as shown at K, Fig. 19, Sheet 1, annexed. This aperture is immediately closed as it passes the lower end of the piston. By this means the necessity of melting out the lead which clogs the dies after each operation, and of filling the cylinder through the dies themselves, or through apertures made for this purpose in the solid end of the cylinder, is obviated, such apertures being injurious to the strength in a part where strength is particularly wanted, and said openings requiring, when so used, to be stopped by means of plugs or screws. By this reversed arrangement, also, great facility in working the machinery is obtained. Oil or other lubricating materials may be easily applied to the dies and cores or other parts situated at the bottom of the cylinder previous to pouring in a fresh charge of metal; and, further, the pipes (instead of being forced upward and being received above the top of the hydraulic press, as in Thomas Burr's plan) are caused to issue downward, and may be immediately wound upon reels, or may be received in a long descending cooling-trough, without requiring to be handled while warm and liable to injury.

Fourthly, and lastly. We arrange, combine, and adapt our mechanism so as to make two or more lengths of pipes at one and the same time and operation, and for this purpose we provide two or more apertures furnished with the requisite apparatus for the formation of the pipes.

All these improvements will be better understood by referring to the accompanying drawings, which are sectional and detached views of the cylinder and various parts, to which we shall now refer.

Figure 3:
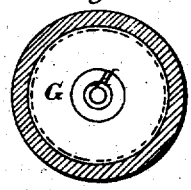
Figure 4:
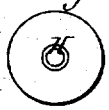
Figure 2:
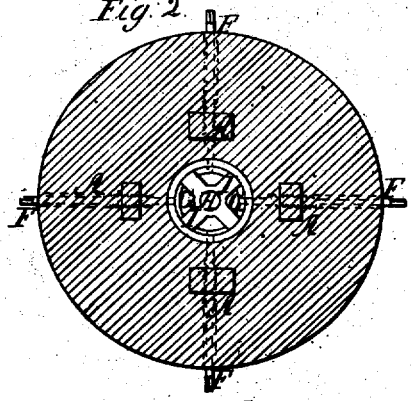
Figure 6:
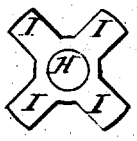
Figure 5:
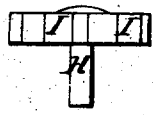
Figure 15:
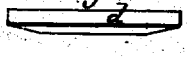
Figure 18:
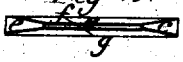
Figure 1:
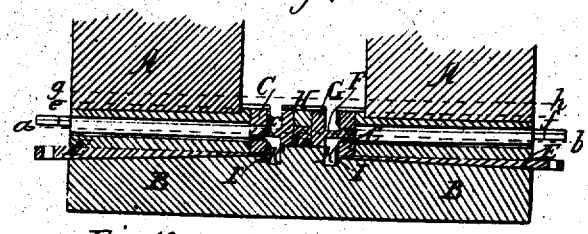

Fig. 1 on Sheet 1 is a vertical section of the lower portion of a cylinder, with the piston shown therein, and also our improved construction and adaptation of a short core with the die applied thereto. Fig. 2 is a horizontal section of the cylinder, taken in the line *a b* in Fig. 1, or just above the bridge, core, and die. Fig. 3 is another similar partial section of the same, taken on the line *c d* in Fig. 1, or just below the bridge, for the purpose of showing the die more clearly. Fig. 4 is a plan view of the die detached, showing the situation of the core within the aperture. Fig. 5 is a detached side view of the short fixed core and its cross-bar or bridge, and Fig. 6 is a plan view of the same.

Figure 22:
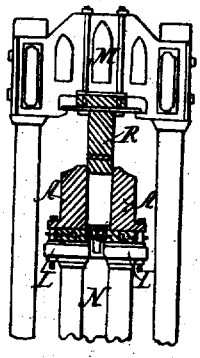
Figure 19:
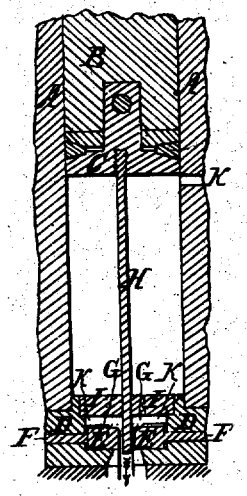

A A, Fig. 1, is a portion of the cylinder; B, the piston, which is fixed or stationary in the strong top frame-work of the hydraulic press. C is the piston face or end, (attached to the body of the piston,) the various parts of which are shown separate at Figs. 13 to 18, inclusive, and will be described hereinafter. D is the lower end or bottom of the cylinder, firmly attached thereto by bolts, and also to a strong table or platform placed upon a hollow pillar, which stands upon the top of the usual ram of the hydraulic press. (The table and parts below are shown at Fig. 22, Sheet 2.) E is the die, which is fitted into the bottom of the cylinder in a recess or cup, as shown in the drawings. F F are adjusting-screws for setting or regulating the situation of the die as regards the core. G, Fig. 19, and Figs. 2 and 3, is a thin steel plate fitted into the recess in the bottom of the cylinder, merely for the purpose of preventing the metal from being driven between the edges of the die and the recess, or to the adjusting-screws, the threads of which might otherwise become clogged. It is exhibited in several of the drawings, thus leaving the chamber between the bridge and the die of a cylindrical form. It is, however, not essential, since the chamber may be of any convenient form, and, in fact, the plate G and the ring Z (hereinafter described) may both be dispensed with altogether; but, as a substitute for the plate G, we prefer the steel ring Z, which makes the chamber conical, and is employed and exhibited in Figs. 1 and 20, Sheet 1. The diameter of the aperture through the steel ring Z is greatest at the edge or side next to the bridge, and, diminishing downward, it is smallest at the end next to the die, the aperture being thus of the form of an inverted cone; but we have sometimes made it cylindrical.

Figure 20:
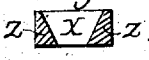
Figure 21:
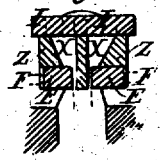

Fig. 20 is a view of a section of the ring Z. Fig. 21 is a sectional representation (on another scale) of the chamber X as formed by the ring Z, with the die E below and the bridge I above it. When fitted in their places in the bottom of the cylinder, as exhibited in Figs. 1 and 21, the steel ring rests upon the die E, protects the adjusting-screws F F by interposition, and forms a support for the bridge I.

In Figs. 1, 2, 5, 6, 19, and 21 the bridge is shown by the letter I and the short fixed core by the letter H, where used.

K, Figs. 1 and 19, shows the situation of the aperture in the upper part of the cylinder, or side or end opposite to the dies, through which the cylinder is filled with melted metal, and which is immediately closed by the passage of the piston end. This is more convenient than to withdraw the piston.

Figure 10:
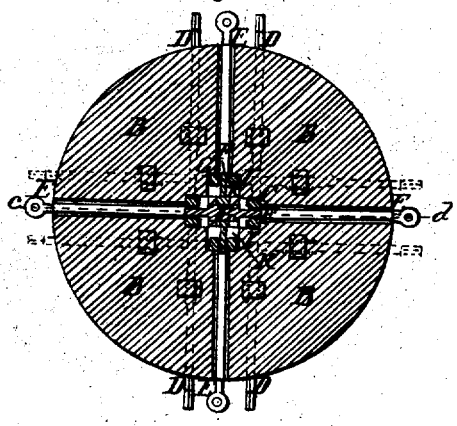
Figure 11:
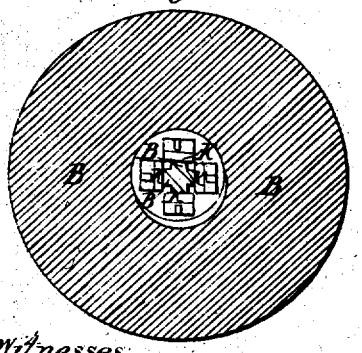
Figure 12:
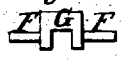
Figure 8:
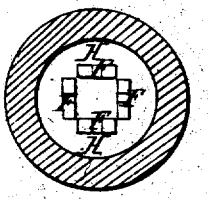
Figure 9:
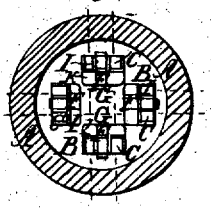

Fig. 7, Sheet 2, is another vertical section of the lower part of a cylinder, showing a novel adaptation of our mechanism for making four different lengths of pipes at one and the same time. Fig. 8 is a partial sectional plan view of the same, taken in the line *g h*, Fig. 7. Fig. 9 is a horizontal section or plan view taken at the line *e f*, the plate H being removed. Fig. 10 is another horizontal section taken through the dies and cores in the line *a b* in Fig. 7. Fig. 11 is a plan view of the bottom of the cylinder, the dies and cores being removed to show its construction. Fig. 12 is a side view of one of the cores detached.

In Figs. 7, 9, 10, and 11, Sheet 2, A A is the cylinder; B B, the bottom of the same. C C are the dies, the cores and apertures of which are in these instances placed in a horizontal position. D D are the screws for properly adjusting the horizontal situation of the dies as regards the cores, and E E are wedges for adjusting the vertical position of the dies to the cores. F F are the cores or mandrels fixed into or forming part of stocks or pieces of metal G G, which are mortised into one another, and also into the bottom of the cylinder, as shown in the drawings. The arrows indicate the course of the metal as it passes out of the cylinder in the form of pipes, which is shown by a red tint, as in the other figures. H is the thin steel plate, (here used instead of the steel ring,) having four apertures formed in it corresponding with the wells or recesses formed in the bottom of the cylinder, which steel plate is placed on the top of the dies to prevent the access of metal to the adjusting-screws, and I I are other plates placed in front of the dies for the same purpose and to prevent its access to the wedges. The bottom of the cylinder has four wells or chambers, K K, formed in it, as shown more particularly in Fig. 11, to allow of the passage of the pipe-metal to the different dies and cores.

Figure 13:
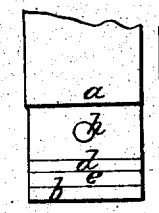
Figure 14:
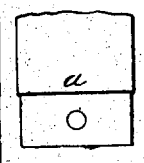
Figure 17:
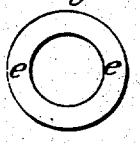
Figure 16:
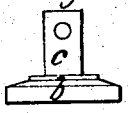

Fig. 13, Sheet 1, is a representation of the end of the piston upon our improved construction. Fig. 14 is a similar representation with the parts detached. (Shown separate at Figs. 15, 16, 17, and 18.) *a* is the body of the piston. *b* is the lower end or face of the piston, attached to the body by the pin *c*. *d* is the upper part of the piston. Between the inclined or conical-shaped sides of the parts *d* and *b* is placed the ring *e*, (shown detached in plan in Fig. 17 and in section at Fig. 18,) and being cut, consequently it will be obliged to expand and keep the piston tightly packed with the cylinder under great pressure, and thereby prevent the escape of the metal. The piston-face is attached to the body *a* by means of a pin, *h*, passed through it, or in any other convenient manner.

Fig. 19 is a vertical section of a cylinder and piston, showing the adaptation of the guide-piece or bridge, through which the long core attached to the piston passes for the purpose of keeping it central with the die. A A is the cylinder. B is the piston-body; C, the face or end of the piston; D, the bottom of the cylinder; E, the die. G is the thin steel plate. (Here exhibited instead of the steel ring that in Figs. 1 and 21 makes the chamber conical in form.) F, the adjusting-screws. H is the long core attached to the piston C, and traveling with it, passing freely through the guide-piece or bridge I I, which has a hole properly bored through it for this purpose, consequently keeping the core at all times steady and central with the die. K is the aperture for supplying the cylinder with melted metal.

Fig. 22, Sheet 2, exhibits the reversed arrangement of the cylinder A and the piston B. L L is the table; M, the top of the hydraulic press. N is the hollow pillar standing upon the ram.

The operation of making pipes or tubes is as follows: The cylinder should be warmed, as mentioned by Thomas Burr, by any convenient means, as well for the purpose of making the apparatus work more easily as to preserve the pipe-metal within at a uniform temperature throughout its mass, and thus to permit it to set equably. When a die, bridge, and core of the required diameter have been applied to the cylinder and properly adjusted, the cylinder and other parts being lowered, a charge of lead or other metal in a fluid state is admitted through the aperture K, Figs. 19 and 1, at the side, or at the end of the cylinder opposite to the die and immediately under the piston, and as soon as this metal is set the hydraulic press is put in action, and as the ram, hollow pillar, table, and cylinder, with its appurtenances, rise upward the feeding-aperture is first closed by the stationary piston, and when this is effected the metal is forced, in the direction of the arrows in Fig. 1, between the arms or apertures of the bridge I through the chamber, and through the space between the die and the core below it, being caused by the extreme pressure and constriction to reunite perfectly around the core in its passage, and leaving the machinery in the form of pipes or tubes. The pipe may be received in a long descending cooling-trough, or may be immediately wound upon reels as fast as it is discharged from the machinery.

The pipe-metal is represented in the drawings by a tint of red color.

We wish it to be understood that we do not confine ourselves to the mode of operation herein described, by making the cylinder rise with the hydraulic ram and other parts and keeping the piston stationary, as the same effects will take place when the cylinder is stationary and the power of the ram is applied to the top of the piston to cause it to descend into the cylinder; and our improvements might also be applied to a cylinder and press fitted up in other respects upon Thomas Burr's plan, whereby the pipe is received over the top of the machinery, although at some disadvantage; or the press might be laid horizonzontally or otherwise. Neither do we confine ourselves to making the bridge which holds or guides either the short or the long cores with four arms only, since it might be made of various constructions, with one, two, or three or more arms or apertures; or it might be a circular plate with holes through it; or it might be constructed as a projection at or near the bottom of the cylinder, with one large aperture nearly surrounding it, and thus hold the core in a horizontal direction, if desired, so as to discharge the pipes laterally or otherwise, all which and other variations will readily suggest themselves to any practical engineer, without departing from the substantial originality of our invention, the remarkable feature of which is that soft metals, where in a set state, being yet under heat, can be made by extreme pressure to reunite perfectly around a core after a separation, and thus be formed into strong pipes or tubes.

Pipes thus made are found to possess great solidity and unusual strength, and a fine uniformity of thickness and accuracy of bore is arrived at, such as, it is believed, has never before been attained by any other machinery. The essential difference in the character of this pipe which distinguishes it (as well as that contemplated by Thomas Burr) from all others heretofore known or attempted is that it is wrought under heat by pressure and constriction from set metal, and that it is not a casting formed in a mold.

We do not claim as our invention and improvement any of the parts of the above-described machinery independently of their arrangement and combination above set forth.

What we claim as our invention, and desire to secure by Letters Patent, is—

The combination of the following parts above described—to wit, the core and bridge or guide-piece—with the cylinder, the piston, the chamber, and the die, when used to form pipes of metal under heat and pressure in the manner set forth, or in any other manner substantially the same.

JOHN HANSON.
CHARLES HANSON.

Witnesses to the signing by the said John Hanson and Charles Hanson:

ALBERT DAVY,
*Consul U. S. A.*
WILLIAM NORTH,
*Clerk to Payne, Eddison & Ford, Solicitors, Leeds.*